US009616843B2

(12) United States Patent
Girardin et al.

(10) Patent No.: US 9,616,843 B2
(45) Date of Patent: Apr. 11, 2017

(54) BARRIER WITH INTEGRATED WHEELCHAIR RESTRAINTS

(75) Inventors: Jean-Marc Girardin, Golden Beach, FL (US); Eric Girardin, N. Miami Beach, FL (US); Joe Esteireiro, Weston, FL (US)

(73) Assignee: Valeda Company LLC, Ft. Lauderdale, FL (US)

( * ) Notice: Subject to any disclaimer, the term of this patent is extended or adjusted under 35 U.S.C. 154(b) by 1320 days.

(21) Appl. No.: 11/847,435

(22) Filed: Aug. 30, 2007

(65) Prior Publication Data

US 2009/0087278 A1 Apr. 2, 2009

Related U.S. Application Data

(63) Continuation-in-part of application No. PCT/US2006/030085, filed on Aug. 2, 2006, and a continuation-in-part of application No. 11/252,326, filed on Oct. 17, 2005, now Pat. No. 7,452,170.

(60) Provisional application No. 60/705,452, filed on Aug. 5, 2005, provisional application No. 60/618,572, filed on Oct. 15, 2004.

(51) Int. Cl.
*A61G 3/08* (2006.01)
*B60R 22/20* (2006.01)
*B60R 22/22* (2006.01)
*B60R 22/24* (2006.01)

(52) U.S. Cl.
CPC ............ *B60R 22/20* (2013.01); *A61G 3/0808* (2013.01); *B60R 22/22* (2013.01); *B60R 22/24* (2013.01)

(58) Field of Classification Search
USPC ............ 410/2, 3, 4, 7, 9–12, 18–19, 21–23; 296/65.04; 280/808, 801.2
See application file for complete search history.

(56) References Cited

U.S. PATENT DOCUMENTS

| 4,040,660 A | 8/1977 | Barecki |
| 4,062,209 A | 12/1977 | Downing |
| 4,103,934 A | 8/1978 | Arnholt |

(Continued)

FOREIGN PATENT DOCUMENTS

| DE | 3204665 A1 | 8/1983 |
| GB | 2130977 A * | 6/1984 |
| WO | 93/21885 A1 | 11/1993 |

*Primary Examiner* — H Gutman
(74) *Attorney, Agent, or Firm* — Daniel A. Tallitsch; Baker & McKenzie LLP

(57) ABSTRACT

The embodiment described and claimed herein are improved barrier-type wheelchair securement systems. In particular, one embodiment of a barrier includes an integral shoulder belt assembly, two integral wheelchair restraint assemblies, and two integral lap belt assemblies. The wheelchair restraint and lap belt assemblies comprise retractors which can be mounted external or internal to the barrier. The integral shoulder belt assembly could be connected to a vertical telescoping member which is movable from a first position, wherein the telescoping member is housed inside of the barrier, to a second position, wherein the shoulder belt assembly is disposed at a proper height for a wheelchair passenger. Alternatively, the shoulder belt assembly could be rigidly mounted to the barrier in a fixed position, or could be adjustable to accommodate passengers of varying size.

13 Claims, 4 Drawing Sheets

(56) References Cited

U.S. PATENT DOCUMENTS

| | | | | |
|---|---|---|---|---|
| 4,113,270 | A | 9/1978 | Barecki | |
| 4,265,478 | A | 5/1981 | Korsgaard | |
| 4,266,822 | A | 5/1981 | Barecki | |
| 4,511,171 | A | 4/1985 | Petersen | |
| 4,623,289 | A | 11/1986 | Apostolos | |
| 4,690,364 | A | 9/1987 | Constantin | |
| 4,754,946 | A | 7/1988 | Constantin | |
| 4,805,954 | A | 2/1989 | Lazaroff | |
| 4,971,341 | A | 11/1990 | Magnuson | |
| 4,973,022 | A * | 11/1990 | Mayland | 248/503.1 |
| 5,026,225 | A * | 6/1991 | McIntyre | 410/23 |
| 5,344,265 | A | 9/1994 | Ullman | |
| 5,388,937 | A | 2/1995 | Farsai | |
| 5,489,141 | A | 2/1996 | Strausbaugh | |
| 5,492,389 | A | 2/1996 | McClintock | |
| 5,567,095 | A * | 10/1996 | James et al. | 410/7 |
| 5,628,595 | A | 5/1997 | Harris | |
| 5,709,408 | A | 1/1998 | Carraway, Jr. | |
| 5,730,500 | A | 3/1998 | Cardona | |
| 5,888,038 | A | 3/1999 | Ditch | |
| 5,895,090 | A * | 4/1999 | Farquhar et al. | 297/216.1 |
| 5,918,937 | A | 7/1999 | Moffia | |
| 6,003,899 | A | 12/1999 | Chaney | |
| 6,050,629 | A * | 4/2000 | Bernhardt et al. | 296/65.01 |
| 6,106,066 | A | 8/2000 | Moffia | |
| 6,113,325 | A | 9/2000 | Craft | |
| 6,149,359 | A | 11/2000 | Cardona | |
| 6,287,060 | B1 * | 9/2001 | Girardin | 410/7 |
| 6,428,254 | B2 | 8/2002 | Craft | |
| 6,474,916 | B2 | 11/2002 | Constantin | |
| 6,524,039 | B1 | 2/2003 | Magnuson | |
| 6,540,294 | B2 | 4/2003 | Moffia | |
| 6,575,677 | B2 | 6/2003 | Craft | |
| 6,685,403 | B2 | 2/2004 | Constantin | |
| 6,698,983 | B1 | 3/2004 | Kiernan | |
| 6,776,564 | B1 | 8/2004 | Kiernan | |
| 6,846,044 | B2 | 1/2005 | Moffia | |
| 6,899,497 | B2 | 5/2005 | Cardona | |
| 6,966,733 | B2 | 11/2005 | Craft | |
| 6,974,184 | B1 | 12/2005 | Moffia | |
| D521,756 | S | 5/2006 | Moffia | |
| 7,040,847 | B1 | 5/2006 | Cardona | |
| 7,090,251 | B2 | 8/2006 | Tame | |
| 7,452,170 | B2 * | 11/2008 | Girardin | 410/23 |
| 7,455,490 | B1 * | 11/2008 | Goosen | 410/7 |
| 2001/0001031 | A1 * | 5/2001 | Craft | 410/7 |
| 2002/0110434 | A1 * | 8/2002 | Ditch et al. | 410/7 |
| 2002/0114679 | A1 * | 8/2002 | Craft | 410/7 |
| 2003/0190208 | A1 * | 10/2003 | Cardona et al. | 410/7 |
| 2004/0005203 | A1 * | 1/2004 | Craft | 410/7 |
| 2004/0113451 | A1 | 6/2004 | Szymanski | |
| 2005/0214088 | A1 | 9/2005 | Acton | |
| 2005/0275211 | A1 | 12/2005 | Kennedy, Sr. | |
| 2006/0110230 | A1 * | 5/2006 | Girardin | 410/7 |
| 2006/0159542 | A1 | 7/2006 | Ditch | |
| 2006/0193708 | A1 * | 8/2006 | Ditch et al. | 410/7 |
| 2006/0208546 | A1 | 9/2006 | Moffia | |
| 2008/0247837 | A1 * | 10/2008 | Cardona | 410/23 |
| 2009/0087278 | A1 * | 4/2009 | Girardin et al. | 410/3 |

* cited by examiner

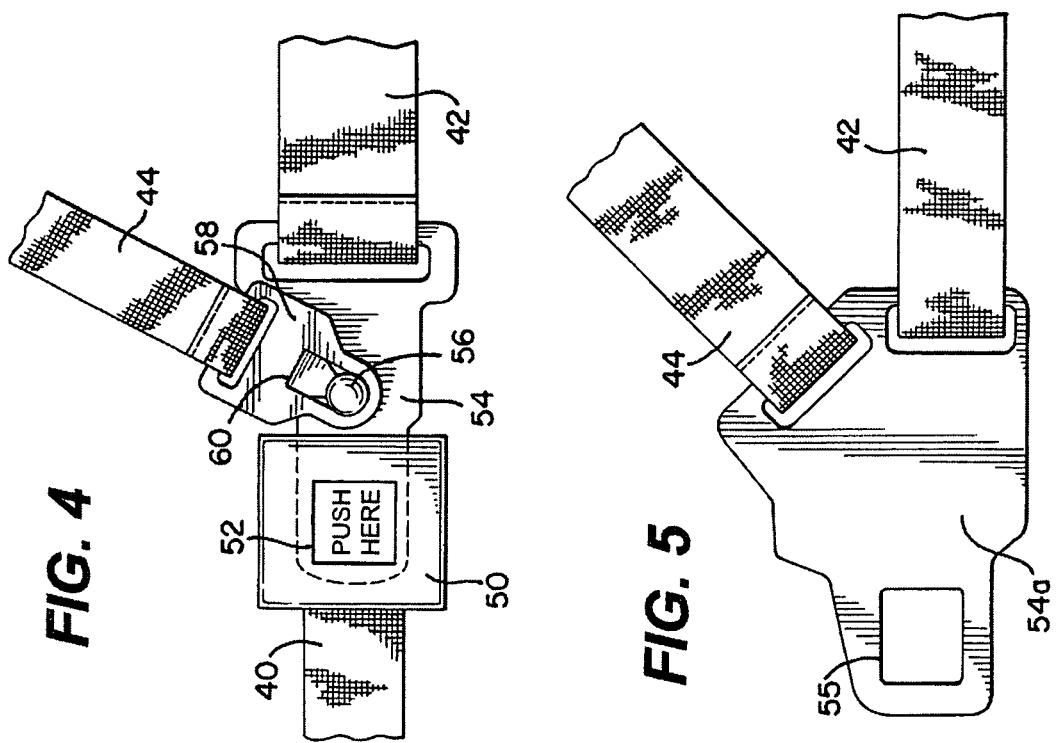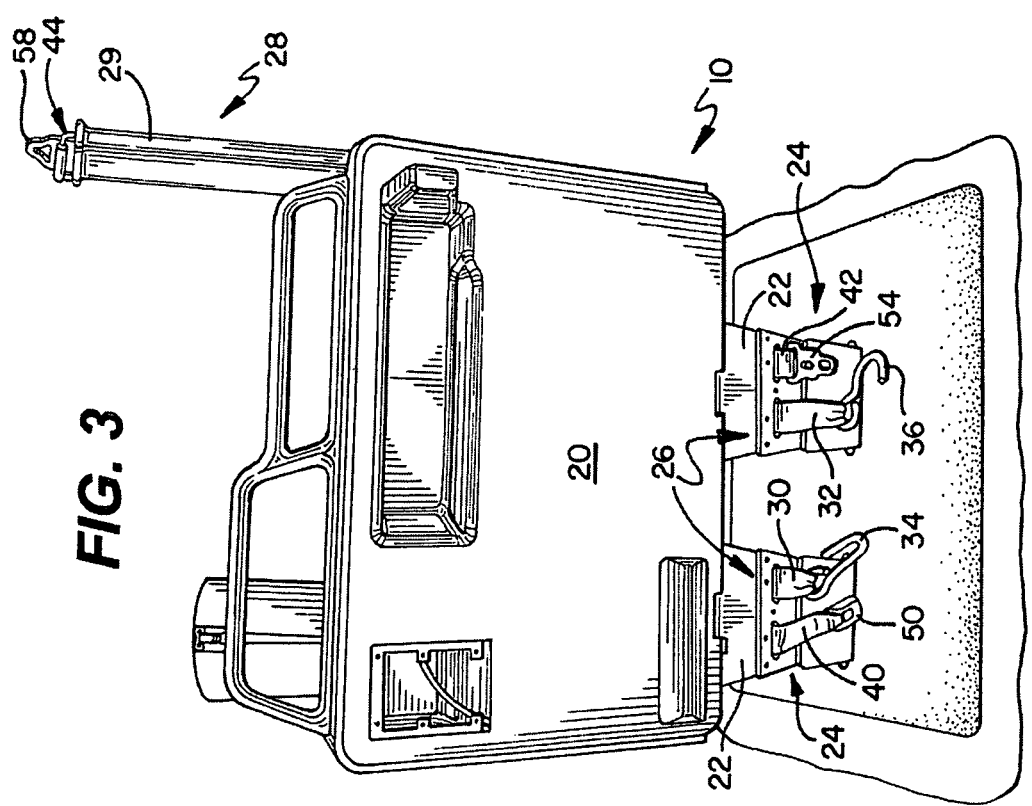

BARRIER WITH INTEGRATED WHEELCHAIR RESTRAINTS

REFERENCE TO CO-PENDING APPLICATION

This is a continuation-in-part of International Application No. PCT/US2006/030085, entitled RESTRAINT SYSTEM and filed on Aug. 2, 2006, which claims priority to Provisional U.S. Application Ser. No. 60/705,452, entitled RESTRAINT SYSTEM and filed on Aug. 5, 2005. This is also a continuation-in-part of U.S. application Ser. No. 11/252,326, entitled RESTRAINT SYSTEM and filed on Oct. 17, 2005, which claims priority to Provisional U.S. Application Ser. No. 60/618,572, entitled AUTOMATIC BELT RETRACTOR RELEASE SYSTEM and filed on Oct. 15, 2004. International Application No. PCT/US2006/030085, U.S. application Ser. No. 11/252,326 and Provisional U.S. Application Ser. No. 60/618,572 and 60/705,452 are hereby incorporated by reference.

FIELD OF THE INVENTIONS

The embodiments described and claimed herein relate generally to wheelchair securement devices for vehicles. More specifically, at least some of the embodiments described herein relate to a "drop-in" wheelchair securement system for a transit vehicle, such as a bus, train, aircraft, boat or the like.

BACKGROUND OF THE INVENTIONS

It is very commonplace for modern transit vehicles to incorporate wheelchair-friendly seating arrangements. For example, most transit vehicles utilize at least some side-facing seating to increase the aisle-width, whereby the side-facing seating is arranged so that the back of the seated passenger is against a side wall. Generally, the side facing seating is located near the front of the bus. In this way, the width of the aisle is much greater near the front (or the entrance) of the bus to allow wheelchair passengers to easily navigate down the aisle. Usually, the side-facing seating areas incorporate fold-up seats so that the side-facing seating area can easily be converted from a seating or standing area to a wheelchair securement area.

Most transit vehicles which have both forward facing and side facing seating usually include barriers or the like to separate the forward facing seating areas from the side facing seating areas. These barriers are generally vertical panels which are secured to either the floor or the sidewall of the bus. Often times, these barriers are "drop-in" systems which are pre-configured to include wheelchair restraints. As such, the drop-in barriers simplify installation of wheelchair restraints for transit vehicle manufacturers. One example of such a barrier is disclosed in U.S. Pat. No. 6,575,677 ("Craft"). Craft discloses a wheelchair restraint system which mainly comprises a barrier. The Craft barrier divides a forward-facing seating area from a side-facing seating area. The Craft restraint system also includes a wheelchair attachment assembly for anchoring the wheelchair and retractable lap belts which mount to the legs of the barrier. The Craft restraint system further comprises a shoulder belt which mounts to a sidewall of the bus. For other examples of prior art wheelchair restraint systems, see U.S. Pat. Nos. 4,103,934; 6,113,325; 6,428,254; 6,524,039; and 6,966,733.

While the prior art systems may be successful in providing a wheelchair restraint solution for transit vehicles, a number of pressing problems remain with the prior art securement technology. For example, while many of the prior art systems include shoulder belts, the shoulder belt assemblies of the prior art are adapted to be mounted to a sidewall of the transit vehicle. This arrangement requires substantial labor to install in a transit vehicle; not only must the transit vehicle manufacturer mount the barrier to the floor, the manufacturer must also mount the shoulder belt to the wall. This two-step installation process can also be complicated by the layout of the transit vehicle. In some cases, wall space may not be available for the shoulder belt assembly in the area selected for the wheelchair securement system. This could happen if the area selected to be the wheelchair restraint area is not aligned with a pillar between windows. As a result, the prior art systems limit the number of possible seating configurations for a bus.

Furthermore, the prior art barriers include belt retractors which are usually attached to the legs of the barrier. The prior art belt retractors stick outwardly from the barrier and, as such, encroach into an area which otherwise could be occupied by seated or standing passengers when not utilized by wheelchair passengers and present a tripping hazard.

SUMMARY OF THE INVENTIONS

The embodiments described and claimed herein solve at least some of the problems of the prior art wheelchair restraint systems. For example, a first embodiment comprises a barrier having an integrated shoulder belt assembly. Rather than being mounted to a sidewall of the transit vehicle, like the prior art, the shoulder belt assembly of the first embodiment is integrated into the barrier whereby the shoulder belt extends from an upper corner of the barrier near a side wall for convenient access by the wheelchair passenger. As a result, the first embodiment provides a "drop-in" wheelchair securement system that includes most of the necessary restraints for wheelchair passenger (usually, additional wheelchair restraints are required which attach to the front side of the wheelchair thereby preventing rearward movement of the wheelchair). For this reason, a vehicle manufacturer can install the first embodiment much more easily and much more quickly as compared to the installation of the prior art systems. Unlike the prior art, the system of the first embodiment requires only one installation step to install the rear wheelchair restraints, the lap belt and the shoulder belt; i.e., the first embodiment of the barrier need only be mounted to the interior of the bus. In addition, the first embodiment provides greater flexibility for the interior designer. Since the first embodiment does not incorporate a sidewall mounted shoulder belt assembly, the first embodiment need not be located near a pillar.

A second embodiment, like the first embodiment, comprises a barrier which includes an integrated shoulder belt assembly. However, the shoulder belt assembly of the second embodiment is adjustable to accommodate wheelchair passengers of varying size.

A third embodiment comprises a barrier which incorporates an integrated telescoping shoulder belt assembly. In this embodiment, the shoulder belt extends from or through a top end of a vertically mounted telescoping member. The telescoping member is movable from a first position, wherein the telescoping member is disposed generally inside of the barrier, to a second position, wherein the telescoping member is in an extended position. In the first position, the telescoping member is in a storage position, wherein the telescoping member does not greatly encroach into space which could otherwise be used by a standing or seated passenger. In the second position, the telescoping member is in an operable position for a wheelchair passenger, whereby a distal end of the shoulder belt (i.e. the pin connector) is disposed approximately above a shoulder of the wheelchair passenger, within easy reach.

A fourth embodiment comprises a barrier having integrated lap belt assemblies which are mounted at least partially inside of the barrier such that the lap belt assemblies do not significantly protrude beyond an outside surface of the barrier. As compared to the prior art lap belt assemblies, which are mounted to an outside surface of the barrier legs, the fourth embodiment is not obtrusive and does not encroach in space that could otherwise be used by standing and seated passengers. Furthermore, the internally-mounted lap belt assemblies do not present a tripping hazard like the prior art systems.

Other embodiments, which include some combination of the features discussed above and below and other features which are known in the art, are contemplated as falling within the claims even if such embodiments are not specifically identified and discussed herein.

BRIEF DESCRIPTION OF THE DRAWINGS

These and other features, aspects, objects, and advantages of the embodiments described and claimed herein will become better understood upon consideration of the following detailed description, appended claims, and accompanying drawings where:

FIG. 3 is a front view of the same with the shoulder belt assembly in the extended position;

FIG. 4 is a close-up view of the lap and shoulder belt connection;

FIG. 5 is a close-up view of an alternative embodiment of the lap and shoulder belt connection;

Figure 1:
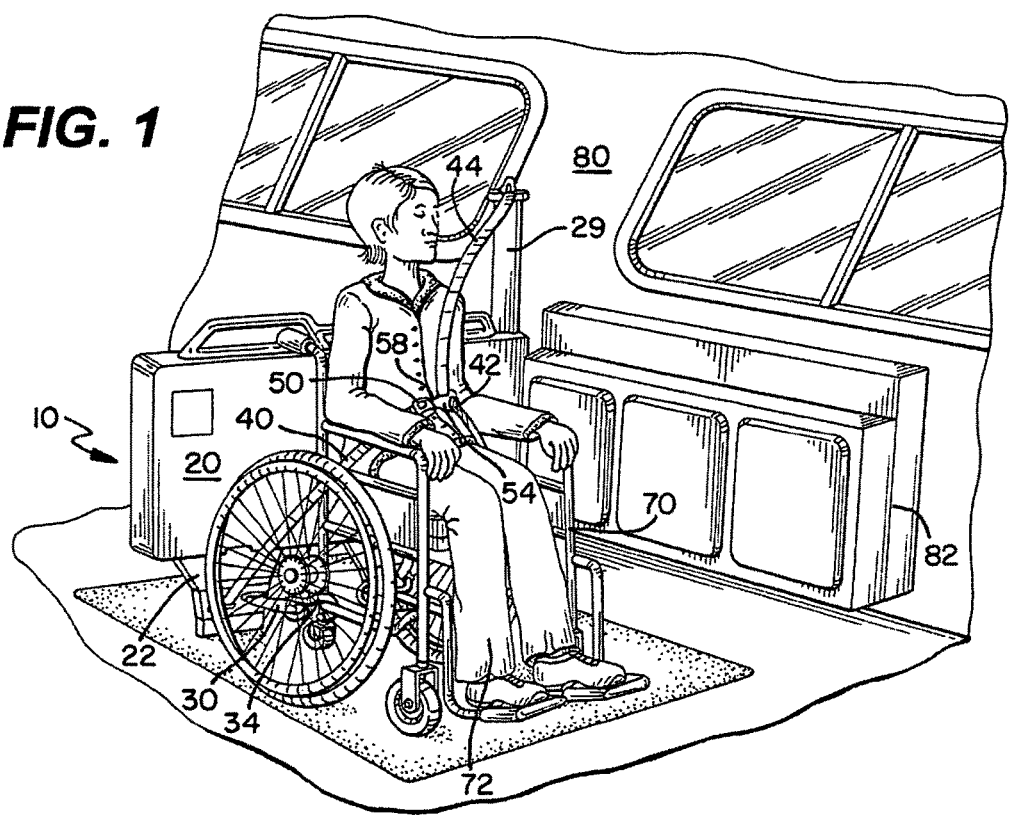
FIG. 1 is a perspective view illustrating one embodiment of a wheelchair securement system in a transit vehicle securing a wheelchair and occupant.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE DRAWINGS

Figure 2:
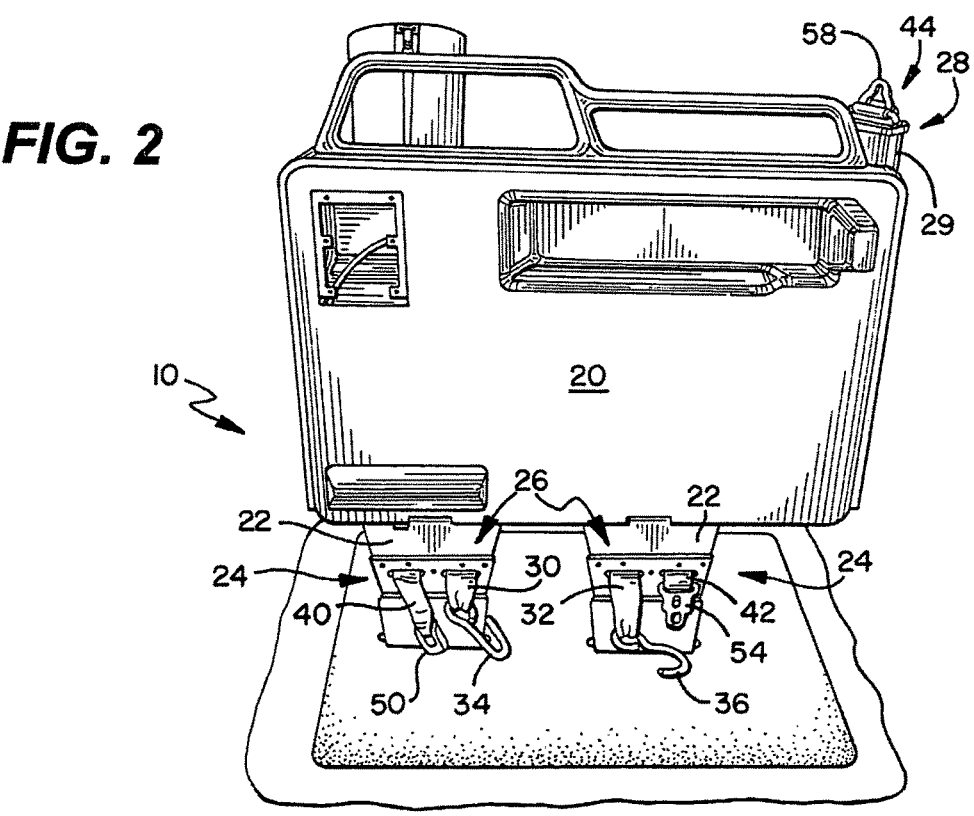
FIG. 2 is a front view of the same with the shoulder belt assembly in the retracted position.

Referring first to FIGS. 1-3, one embodiment of a forward facing wheelchair securement system 10 is shown for securing a wheelchair 70 and its occupant 72 in a transit vehicle 80. The wheelchair securement system 10 is best characterized as a drop-in system for a transit vehicle 80 which is fully-equipped to secure a wheelchair and its passenger from the rear side. In other words, the shown system 10 is intended to be fully assembled for a vehicle manufacturer and needs only to be bolted into place without any further significant installation, although it may be necessary to install additional wheelchair restraints forward of the wheelchair to prevent rearward movement of the wheelchair. The system 10 is intended to be disposed in a vehicle 80, such as a bus, van, train, aircraft, boat, or the like, between forward-facing seating areas and side-facing seating areas. The side seating areas 82 include stowable seats or the like (such as a fold-up seat) so that the seats can be stowed away when a wheelchair passenger boards the vehicle 80, as depicted in FIG. 1. Although depicted in conjunction with a side-facing seating area 82, it is contemplated that the system 10 can be used in conjunction with forward-facing seating. In that case, the system 10 would include a forward-facing stowable seat or the like.

Referring now primarily to FIG. 2, the wheelchair securement system 10 generally comprises a barrier 20, which has two legs 22 for engagement with a floor of the vehicle 80. Although shown with two legs 22, any number of leg(s) is contemplated including a single leg. Furthermore, although the figures depict the barrier being engaged with a floor of the vehicle 80, it is contemplated that the barrier could include supports which engage with a sidewall or even a ceiling of the vehicle.

The barrier 20 also includes two integral lap belt assemblies 24 and two integral wheelchair restraint assemblies 26, which are mounted internal to the barrier 20 and at least partially within the two legs 22. Although FIG. 2 contemplates the retractors being mounted internal to the barrier, it should be understood that other embodiments could include retractors mounted external to the barrier 20. As shown, the only portion of the assemblies 24, 26 that protrude from the barrier 20 are the lap belts 40, 42, the lap belt buckle (or connector) 50, 54, the restraint belts 30, 32, and the wheelchair fasteners 34, 36. One of the lap belt assemblies 24 includes a male connector 54 and the other lap belt assembly 24 includes a female connector 50. With regards to the restraint assemblies 26, each of the assemblies includes a wheelchair fastener 34, 36, which could be any type of fastener known to a person of ordinary skill in the art. The shown fastener is an anchor (or S-hook) 34, 36, which can be easily attached to and easily removed from any portion of wheelchair 70, such as a structural member.

The barrier 20 also includes an integrated shoulder belt assembly and telescoping member 28. As depicted, the shoulder belt assembly includes a shoulder belt 44 and a connector 58 for connecting to either or both of the male and female connectors 50, 54. Alternatively, the shoulder belt 44 could attach at any point on the lap belt assemblies 24. Although the shoulder belt assembly 28 would be functionally operable if fixed in the lowered position as depicted in FIG. 2, the shoulder belt assembly 28 incorporates a telescoping member 29. As shown in FIG. 2, the telescoping member 29 is in a retracted position inside of the barrier 20, such that it does not encroach into space that could otherwise be used by standing or seated passengers. However, when a wheelchair passenger 72 boards the vehicle 80, the telescoping member can extend upwardly, out of the barrier, to elevate the shoulder belt 44 to a suitable height above a shoulder of the wheelchair occupant 72, as shown in FIGS. 1 and 3.

The telescoping member 29 could be manually operable, wherein the user would pull the member 29 upwardly to the extended position. In such a case, locking members could be used to lock the telescoping member in the extended position and/or at the retracted position. In addition, the locking members could be adapted to lock the telescoping member 24 at varying heights to accommodate passengers of varying height.

The barrier could also include mechanical means for extending and/or retracting the telescoping member 24. For example, a gas or coiled spring could be used to bias the telescoping member 24 towards the extended or retracted position. If towards the extended position, a locking member could be used to lock the telescoping member 24 in the retracted position. To extend the telescoping member 29, the user would simply release the locking member through a hand or foot release lever or through electronic means. To retract the telescoping member, the user would simply push the telescoping member 29 to the retracted position and engage the locking member. The opposite would apply if the spring biased the telescoping member towards the retracted position.

Alternatively, a two-way pneumatic cylinder or an electric motor could be used to extend and retract the telescoping member 29. Controls for the member 29 could be provided near the barrier 10, or at a remote location such as the driver's station.

As depicted best by FIG. 1, the lap belts 40 and 42 are adapted to be drawn across the lap of a wheelchair passenger 72 and connected together to adequately secure the passenger 72. Likewise, the shoulder belt 44 is adapted to be drawn across the shoulder of the wheelchair passenger 72 and connected with the lap belt. Referring now to FIG. 4, the connections 50, 54, 58 are shown. As discussed above, one of the lap belts 40 terminates with a female connector 50, while the other of the lap belts 42 terminates with a male connector 54. The shoulder belt 44 terminates in a connector 58 including a keyhole shaped aperture 60. Both of the lap belts 40, 42 are adapted to be retractable, such that the connectors 50, 54 meet near a wheelchair passenger's 72 pelvic area. However, it is contemplated that one of belts could be fixed whereby the connectors 50, 54 could meet near the wheelchair passenger's 72 hip. The female connector 50 includes a release button 52 for releasing the male connector 54, while the male connector 54 includes a pin connector 56 for engagement with the keyhole shaped aperture 60 of the shoulder belt connector 58. However, the shoulder belt connector 58 can be adapted to connect at any point on the lap belt assembly 24, such as either the female connector 50 or male connector 54, in any suitable manner. For example, the shoulder belt connector 58 could be integrated into the male connector 54a as shown in FIG. 5.

Figure 6:
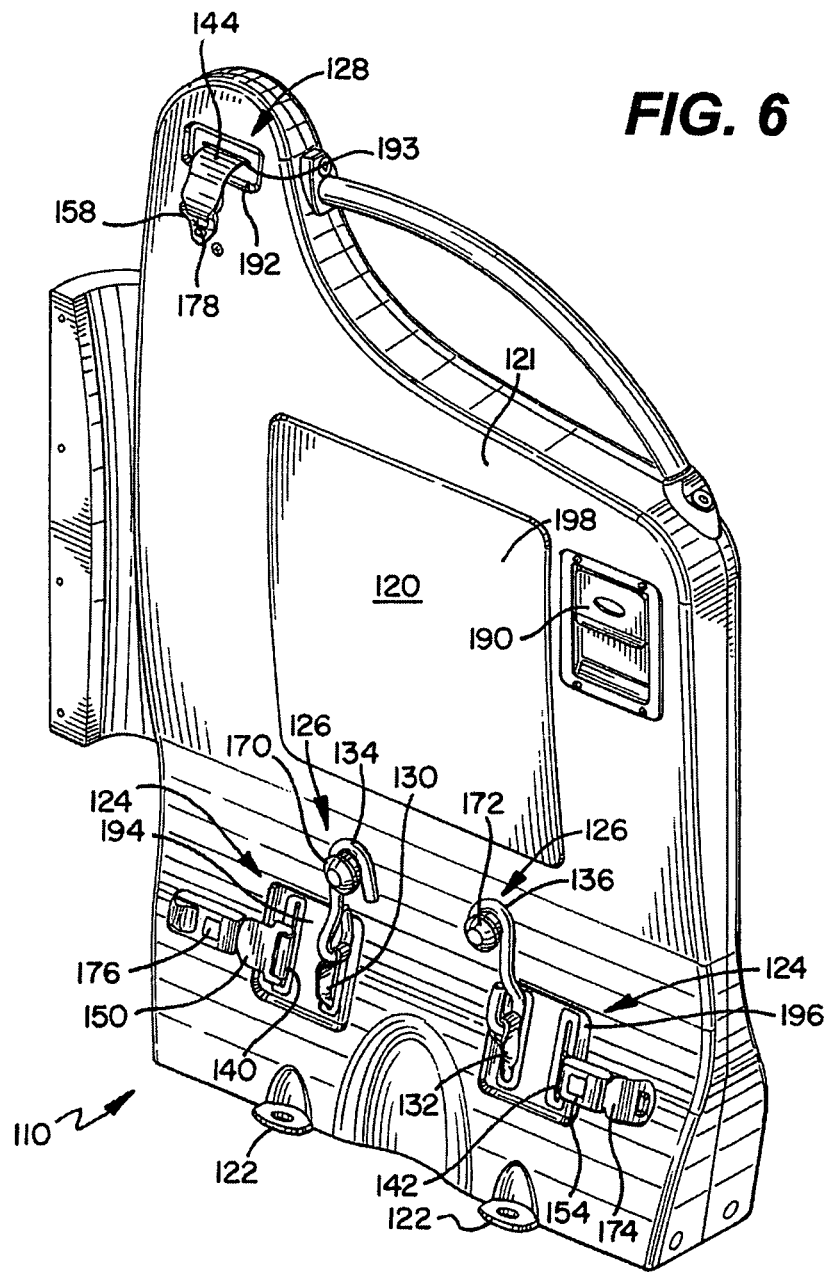
FIG. 6 is a perspective view of another embodiment of a wheelchair securement system.
Figure 7:
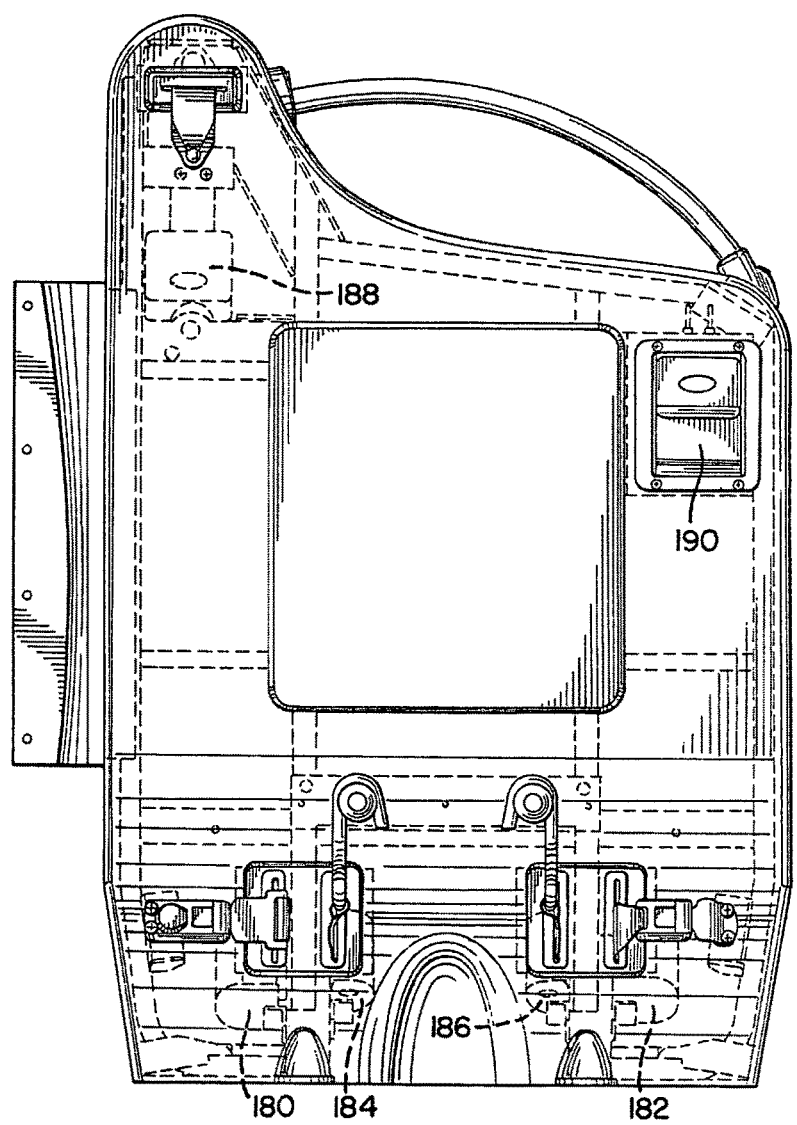
FIG. 7 is a front view of the same with the front panel removed.

Referring now to FIGS. 6 and 7, another embodiment of a forward facing wheelchair securement system 110 is shown, which is adapted to be installed in a transit vehicle 80 for securing a wheelchair 70 and its occupant 72. This embodiment of the wheelchair securement system 110, like the previously described system 10, is best characterized as a drop-in system for a transit vehicle 80. In other words, the shown system 110 can be fully assembled for a vehicle manufacturer and needs only to be bolted into place without any further significant installation, although it may be necessary to install additional wheelchair restraints forward of the wheelchair to prevent rearward movement of the wheelchair. The system 110 can be disposed in a transit vehicle 80, such as a bus, train, aircraft, boat, or the like, between forward-facing seating areas and side-facing seating areas, although it is contemplated that it could also be installed between similar arranged seating areas.

The wheelchair securement system 110 comprises a barrier 120 with two flanges or brackets 122 for engagement with a floor of a vehicle 80. Although shown with two flanges 122, any number of flanges(s) is contemplated including a single flange. Furthermore, although the figures depict the barrier being engaged with a floor of the vehicle 80, it is contemplated that the barrier could include flanges which engage with a sidewall or even a ceiling of the vehicle.

The barrier 120 also includes two integral lap belt assemblies 124, two integral wheelchair restraint assemblies 126, and an integral shoulder belt assembly 128, each of which are disposed generally inside of the barrier. As shown in FIG. 7, each of the assemblies 124, 126, and 128 include retractors 180, 182, 184, 186, 188 which are mounted to the internal frame of the barrier 120. At least one access panel 198 is also provided on the barrier 110 to provide access to the internal components for maintenance purposes. Although the figures show the retractors being mounted internal to the barrier, it is contemplated that other embodiments could include retractors mounted external to the barrier 120.

Referring again to both FIGS. 6 and 7, the assemblies 124, 126, 128 include panels 192, 194, 196 which are generally flush with an external surface of the barrier 20. The panels 192, 194, 196 include slots 193 through which the straps 130, 132 and belts 140, 142, 144 pass from the interior to the exterior of the barrier. As shown, the panels 192, 194, 196 are separate components which attach to the barrier; however, it is contemplated that the panels 192, 194, 196 could be integrated into the outer body or shell 121 of the barrier 120. Moreover, although the panel 192 is shown fixed relative to the barrier, it is contemplated that the panel 192 and its associated slot 193 could be movable along a vertical axis and/or a horizontal axis to accommodate passengers of varying height.

As shown, the only portion of the assemblies 124, 126, 128 that protrude from the barrier 120 are the lap belts 140, 142, the lap belt buckle (or connector) 150, 152, the shoulder belt 144, the shoulder belt connector 158, the restraint belts 130, 132, and the wheelchair fasteners 134, 136. One of the lap belt assemblies 124 includes a male connector 150 and the other lap belt assembly 124 includes a female connector 154. With regards to the restraint assemblies 126, each of the assemblies includes a wheelchair fastener 134, 136, which could be any type of fastener known to a person of ordinary skill in the art. The shown fastener is an anchor 134, 136, which can be easily attached to and easily removed from any portion of wheelchair 70, such as a structural member.

The wheelchair barrier includes retaining members 170, 172, 174, 176, 178 to hold the belts and straps 130, 132, 140, 142, 144 when not in use. The retaining members 170, 172, 174, 176, 178 not only reduce the noise associated with the connectors 150, 154, 158 and fasteners 134, 136 but also reduces potential damage to the barrier. Without the retaining members, the connectors and fasteners would otherwise be free to vibrate and bang up against the barrier as the vehicle was in use. Moreover, the retaining members hold the connectors and fasteners flush up against the barrier, thereby reducing any potential tripping hazard for passengers. As shown in the figures, the retaining members 170, 172 are peg-like structures, while the retaining member 174 is a male connector, the retaining member 176 is a female connector, and the retaining member 178 is a pin connector like structure.

The wheelchair barrier 120 also includes a remote control device with a release latch 190 for releasing one or more of the retractors 180, 182, 184, 186, 188. For example, the embodiments could include the system described in provisional application No. 60/705,452 and PCT application no. PCT/US06/30085 (which are incorporated herein by reference).

Figure 8:
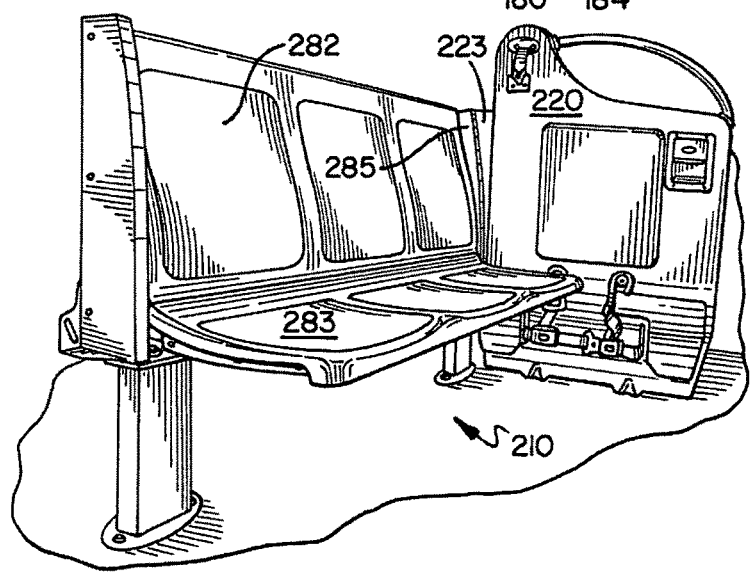
FIG. 8 is yet another embodiment of a wheelchair securement system to which a seating area is integrated therewith.

Finally, and with reference to FIG. 8, yet another embodiment of a forward facing wheelchair securement system 210 is shown, which is adapted to be installed in a transit vehicle 80 for securing a wheelchair 70 and its occupant 72. This embodiment of the wheelchair securement system 210 includes both a barrier module 220 and a side seating area module 282 to form an essentially complete "drop in" system. In the shown embodiment, the barrier module 220 is connectable to the side seating module 282 at flange areas 285, 223, although the two modules could be pre-assembled (or integrally formed) by the manufacturer. The barrier 220 is nearly identical to the previously-discussed embodiment of the barrier 120, although it is contemplated that the first embodiment (or any other version) of the barrier 20 could also be used. The side seating area includes a stowable or flip seat 283 to accommodate wheelchair passengers.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A wheelchair securement system for a vehicle, the system comprising:
a barrier having at least one integrated shoulder restraint assembly, at least one integrated wheelchair restraint assembly, and at least one integrated lap restraint assembly;
each of the at least one wheelchair restraint assembly including a retractable restraint and a universal fastener that are operable to secure a wheelchair;
the at least one lap restraint assembly and shoulder restraint assembly being operable to secure a seated wheelchair occupant; and,
the barrier defines a generally planar boundary for the wheelchair whereby the wheelchair and the seated wheelchair occupant are positioned forward of the generally planar boundary when secured;
wherein: the retractable restraint of each of the at least one wheelchair restraint assembly is a retractor and a strap, whereby the strap is retractable into the retractor; and,
the at least one wheelchair restraint assembly is disposed at least partially inside of the barrier;
further including a restraint control assembly, the restraint control assembly being operatively associated with the retractor of at least one wheelchair restraint assembly to manipulate the retractor between a locked position and a released position, whereby activation of the restraint control assembly places the retractor in the released position for a predetermined period of time to permit operation of the retractor.

2. The system of claim 1, wherein the restraint control assembly includes a remotely located paddle handle for activating the restraint control assembly.

3. The system of claim 2 wherein the paddle handle is disposed on the barrier.

4. A wheelchair securement system for a vehicle, the system comprising:
a barrier having at least one lap belt and at least one shoulder belt, the at least one shoulder belt being integrated with the barrier;
the at least one lap belt and the at least one shoulder belt being operable to secure a seated wheelchair occupant;
the barrier defining a partition whereby the wheelchair and the seated wheelchair occupant are positioned forward of the partition when secured;
wherein: the barrier further comprises at least one wheelchair restraint assembly, the wheelchair restraint assembly including a strap and a retractor, the strap being extendable from the retractor for engagement with a wheelchair.

5. A wheelchair securement system for securing a wheelchair and a wheelchair occupant in a vehicle, the system comprising:
a barrier having, as integrated components, a first and second lap belt assembly, a first and second wheelchair restraint assembly, and a shoulder belt assembly;
the first and second lap belt assembly having a first and second restraint, respectively, the first and second wheelchair restraint assembly having a third and fourth restraint, respectively, and the shoulder belt assembly including a fifth restraint;
a male connector being attached to a distal end of the first restraint and a female connector being attached to a distal end of the second restraint, the male and female connector being adapted to mate;
a first anchor being attached to a distal end of the third restraint, and a second anchor being attached to a distal end of the fourth restraint; and,
a connector attached to a distal end of the fifth restraint, the connector being attachable to a portion of the first or second lap belt assembly;
wherein: the system further includes a restraint control assembly;
at least one of first lap belt assembly, the second lap belt assembly, the shoulder belt assembly, the first wheelchair restraint assembly, or the second wheelchair restraint assembly includes a retractor; and,
the restraint control assembly is operatively associated with the retractor to manipulate the retractor between a locked position and a released position, whereby activation of the restraint control assembly places the retractor in the released position for a predetermined period of time to permit operation of the retractor.

6. The system of claim 5, wherein the restraint control assembly includes a remotely located paddle handle for activating the restraint control assembly.

7. The system of claim 6 wherein the paddle handle is disposed on the barrier.

8. A wheelchair securement system for securing a wheelchair and a wheelchair occupant in a vehicle, the system comprising:
a barrier having, as integrated components, a first and second lap belt assembly, a first and second wheelchair restraint assembly, and a shoulder belt assembly;
the first and second lap belt assembly having a first and second restraint, respectively, the first and second wheelchair restraint assembly having a third and fourth restraint, respectively, and the shoulder belt assembly including a fifth restraint;
a male connector being attached to a distal end of the first restraint and a female connector being attached to a distal end of the second restraint, the male and female connector being adapted to mate;

a first anchor being attached to a distal end of the third restraint, and a second anchor being attached to a distal end of the fourth restraint; and, a connector attached to a distal end of the fifth restraint, the connector being attachable to a portion of the first or second lap belt assembly;

wherein the barrier further comprises at least a first, second, and third retaining member being configured to hold a portion of the wheelchair restraint assembly, lap restraint assembly and shoulder restraint assembly, respectively, generally flush against the barrier when at least one the first, second, third, fourth, and fifth restraints are not in use.

9. A wheelchair securement system for securing a wheelchair and a wheelchair occupant in a vehicle, the system comprising:

a restraint control assembly and a barrier, the barrier having a first and second lap belt assembly, a first and second wheelchair restraint assembly, and a shoulder belt assembly;

the first and second lap belt assembly including a first and second strap and a first and second retractor, respectively, the first and second wheelchair restraint assembly including a third and fourth strap and a third and fourth retractor, respectively, and the shoulder belt assembly including a fifth strap and a fifth retractor, each strap being extendable from its respective retractor;

the restraint control assembly being operatively associated with at least one of the first, second, third, fourth or fifth retractors to manipulate the retractor between a locked position and a released position, whereby activation of the restraint control assembly places the retractor in the released position for a predetermined period of time to permit operation of the retractor;

a male connector being attached to a distal end of the first strap and a female connector being attached to a distal end of the second strap, the male and female connector being adapted to mate;

a first anchor being attached to a distal end of the third strap, and a second anchor being attached to a distal end of the fourth strap;

the barrier housing the first, second, third, and fourth retractors; and, a connector being attached to a distal end of the fifth strap, the connector being attachable to a portion of the first or second lap belt assembly.

10. A wheelchair securement system for a vehicle, the system comprising:

a barrier having at least one integrated shoulder restraint assembly, at least one integrated wheelchair restraint assembly, and at least one integrated lap restraint assembly;

each of the at least one wheelchair restraint assembly including a retractable restraint and a universal fastener that are operable to secure a wheelchair;

the at least one lap restraint assembly and shoulder restraint assembly being operable to secure a seated wheelchair occupant; and, the barrier defines a generally planar boundary for the wheelchair whereby the wheelchair and the seated wheelchair occupant are positioned forward of the generally planar boundary when secured;

further including a restraint control assembly, the restraint control assembly being operatively associated with at least one wheelchair restraint assembly to manipulate the at least one wheelchair restraint assembly between a locked position and a released position, whereby activation of the restraint control assembly places the at least one wheelchair restraint assembly in the released position for a predetermined period of time to permit operation of the at least one wheelchair restraint assembly.

11. The system of claim 4 further comprising a restraint control assembly, the restraint control assembly being operatively associated with at least one of the retractors to manipulate the retractor between a locked position and a released position, whereby activation of the restraint control assembly places the retractor in the released position for a predetermined period of time to permit operation of the retractor.

12. The system of claim 9 wherein the wheelchair has an integrated seat back.

13. The system of claim 9 wherein the barrier further comprises at least a first, second, and third retaining member being configured to hold a portion of the wheelchair restraint assembly, lap restraint assembly and shoulder restraint assembly, respectively, generally flush against the barrier when at least one of the first, second, third, fourth and fifth straps are not in use.

* * * * *